US007536183B2

(12) United States Patent
Loganathan et al.

(10) Patent No.: US 7,536,183 B2
(45) Date of Patent: May 19, 2009

(54) NETWORK INTERWORKING THROUGH MESSAGE TRANSLATION

(75) Inventors: Karthic Loganathan, New Albany, OH (US); Ruth S. Gayde, Naperville, IL (US); Avneesh S. Balyan, Columbus, OH (US); Srinivasa Rao Brahmandam, Pickerington, OH (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1126 days.

(21) Appl. No.: 10/421,388

(22) Filed: Apr. 23, 2003

(65) Prior Publication Data

US 2004/0214586 A1 Oct. 28, 2004

(51) Int. Cl.
*H04W 4/00* (2009.01)

(52) U.S. Cl. ............... 455/432.2; 370/386; 370/395.5; 370/401; 370/467; 455/74; 455/422.1; 455/432.1; 455/552.1

(58) Field of Classification Search ......... 370/386, 370/395.5, 401, 467; 455/74, 422.1, 432.1, 455/432.2, 552.1
See application file for complete search history.

(56) References Cited

U.S. PATENT DOCUMENTS

| 5,771,275 | A | * | 6/1998 | Brunner et al. ............. 370/385 |
| 5,852,660 | A | * | 12/1998 | Lindquist et al. ............ 379/230 |
| 5,862,481 | A | * | 1/1999 | Kulkarni et al. .......... 455/432.2 |
| 5,933,784 | A | * | 8/1999 | Gallagher et al. ........ 455/552.1 |
| 6,094,578 | A | * | 7/2000 | Purcell et al. ............. 455/426.1 |
| 6,138,007 | A | * | 10/2000 | Bharatia .................. 455/414.1 |
| 6,332,022 | B1 | * | 12/2001 | Martinez ............... 379/220.01 |
| 6,615,037 | B1 | * | 9/2003 | Bharatia et al. ............. 455/417 |
| 6,697,620 | B1 | * | 2/2004 | Lamb et al. ............... 455/432.1 |
| 7,043,238 | B2 | * | 5/2006 | Ahn et al. ................. 455/432.1 |
| 7,356,001 | B1 | * | 4/2008 | Jones et al. .................. 370/331 |
| 2002/0061745 | A1 | * | 5/2002 | Ahn et al. .................... 455/432 |
| 2002/0094811 | A1 | * | 7/2002 | Bright et al. ................. 455/433 |
| 2002/0115441 | A1 | * | 8/2002 | Alonso et al. ............... 455/445 |
| 2002/0167906 | A1 | * | 11/2002 | La Porta et al. ............. 370/252 |
| 2003/0003930 | A1 | * | 1/2003 | Allison et al. ............... 455/466 |
| 2003/0114155 | A1 | * | 6/2003 | Jain et al. .................... 455/432 |
| 2004/0008723 | A1 | * | 1/2004 | Uchida et al. ............... 370/466 |
| 2004/0137899 | A1 | * | 7/2004 | Hartmaier ................ 455/432.2 |
| 2004/0219935 | A1 | * | 11/2004 | McCann et al. ............. 455/466 |
| 2005/0026646 | A1 | * | 2/2005 | Naim et al. ............... 455/552.1 |
| 2005/0215245 | A1 | * | 9/2005 | Tian et al. ................. 455/422.1 |
| 2006/0052099 | A1 | * | 3/2006 | Parker ...................... 455/426.1 |

\* cited by examiner

*Primary Examiner*—Fan Tsang
*Assistant Examiner*—Hemant Patel (57) ABSTRACT

A method and system for interworking between communications equipment based on different protocols allows communications service providers to use more than one technology in their networks. For example, Mobile Application Part (MAP) messages of TIA-41 are interworked to corresponding messages of the Global System for Mobile Communication (GSM), and GSM MAP messages are interworked to corresponding TIA-41 MAP messages. An inter technology bridge translates location and routing messages between, for example, an originating mobile switching center (MSC) based on a first technology (e.g., TIA-41 or GSM) and a home location register (HLR) based on a second technology (e.g., GSM or TIA-41). The ITB may include one or more databases for storing information useful for generating attributes or parameters required in an output message that cannot be directly generated from information supplied in an associated input message.

24 Claims, 7 Drawing Sheets

TIA-41 MSC ORIGINATING MESSAGE MAPPING

| INCOMING MESSAGING TO ITB | OUTGOING MESSAGE FROM ITB |
|---|---|
| 224 — LOCREQ | Send Routing Information (initial routing info request) — 226 |
| 234 — SRI Ack | locreq — 236 |
| 240 — Resume Call Handling | REDREQ — 242 |
| 244 — TRANUMREQ | Send Routing Information (secondary treatment) — 246 |
| 248 — SRI Ack | tranumreq — 250 |
| 252 — redreq | Resume Call Handling Ack — 254 |

FIG. 4

PARAMETER MAPPING TABLES 224 / 226

| TIA-41 LOCREQ | Status | GSM Send Routing Information | Status |
|---|---|---|---|
| 438 — BILLID (Originating) | M | Call Reference Number — 439 | C |
| 440 — Digits (Dialed) | M | MSISDN (B Subscriber) — 436 | M |
|  |  | GMSC Address — 418 | M |
| 442 — MSC ID (Originating) | M |  |  |

236

| 234 — GSM SRI Ack | Status | TIA-41 locreq | Status |
|---|---|---|---|
| – |  | ESN — 426 | M |
| 414 — IMSI (B Subscriber) | C | MSID — 428 | M |
| 416 — MSRN | C | Digits (Destination) — 430 | M |
|  |  | MSC ID (Serving) — 432 | M |
| 418 — GMSC Address | C |  |  |
| 422 — NAEA Preferred Carrier ID | C | Digits (Carrier) — 434 | O |

242

| 240 — GSM Resume_Call_Handling | Status | TIA-41 Redirection_Request (REDREQ) | Status |
|---|---|---|---|
| 414 — IMSI | M | MSID — 428 | M |
| – |  | ESN — 426 | M |
| Forwarding Data: |  |  |  |
| 448 — Forwarding Reason | M | REDREASON — 454 | M |
| 450 — Forwarded-to-Number | M | – |  |
| 452 — Notification to Calling Party | M | – |  |
| 439 — Call Reference Number | C | BILLID — 438 | M |

250

| 244 — TIA-41 TRANUMREQ | Status | GSM Send Routing Information | Status |
|---|---|---|---|
| 426 — ESN | M |  |  |
| 428 — MSID | M | MSISDN (B Subscriber) — 436 | M |
|  |  | Forwarding Data |  |
| 454 — REDREASON | M | Forwarding Reason — 468 | M |
|  |  | GMSC Address — 418 | M |
| 432 — MSC ID | M |  |  |

250

| 248 — GSM Send Routing Information Ack | Status | TIA-41 tranumreq | Status |
|---|---|---|---|
| Forwarding Data |  |  |  |
| 424 — Forwarding Number | C | Digits (Destination) — 436 | M |
| 422 — NAEA Preferred Carrier Id | C | Digits (Carrier) — 430 | O |

254

| 252 — TIA-41 redreq | Status | GSM Resume Call Handling Ack | Status |
|---|---|---|---|
| – | – | – | – |

GSM MSC IS ORIGINATING
MESSAGE MAPPING

| INCOMING MESSAGING TO ITB | OUTGOING MESSAGE FROM ITB | |
|---|---|---|
| 524 — Send Routing Information (Initial routing info request) | LOCREQ | — 526 |
| 534 — locreq | SRI Ack | — 536 |
| 540 — REDREQ | Resume Call Handling | — 542 |
| 544 — Send Routing Information (secondary treatment) | TRANUMREQ | — 546 |
| 548 — tranumreq | SRI Ack | — 550 |
| 552 — Resume Call Handling Ack | redreq | — 554 |

FIG. 7

PARAMETER MAPPING TABLES

| 524 GSM Send Routing Information | Status | 526 TIA-41 LOCREQ | Status |
|---|---|---|---|
| 721 Call Reference Number | C | BILLID (Originating) 720 | M |
| 714 MSISDN (B Subscriber) | M | Digits (Dialed) 718 | M |
| | | MSC ID (Originating) 722 | M |
| 716 GMSC Address | M | | |

| 534 TIA-41 locreq | Status | 536 GSM SRI Ack | Status |
|---|---|---|---|
| 726 ESN | M | – | |
| 728 MSID | M | IMSI (B Subscriber) 736 | C |
| 732 Digits (Destination) | M | MSRN 738 | C |
| | M | GMSC Address 742 | C |
| 730 MSC ID (Serving) | | 740 | |
| 734 Digits (Carrier) | O | NAEA Preferred Carrier ID | C |

| 540 TIA-41 Redirection_Request (REDREQ) | Status | 542 GSM Resume_Call_Handling | Status |
|---|---|---|---|
| 728 MSID | M | IMSI 736 | M |
| 726 ESN | M | – | |
| | | Forwarding Data: | |
| 742 REDREASON | M | Forwarding Reason 744 | M |
| – | | Forwarded-to-Number 746 | M |
| – | 748 | Notification to Calling Party | M |
| 720 BILLID | M | Call Reference Number 721 | C |

| 544 GSM Send Routing Information | Status | 546 TIA-41 TRANUMREQ | Status |
|---|---|---|---|
| 714 MSISDN | M | ESN 726 | M |
| | | MSID 728 | M |
| Forwarding Data | | | |
| 718 Forwarding Reason | M | REDREASON 724 | M |
| | | MSC ID 730 | M |
| 716 GMSC Address | M | | |

| 548 TIA-41 tranumreq | Status | 550 GSM Send Routing Information Ack | Status |
|---|---|---|---|
| | | Forwarding Data | |
| 750 Digits (Destination) | M | Forwarding Number 754 | C |
| 752 Digits (Carrier) | O | NAEA Preferred Carrier ID | C |

| 552 GSM Resume Call Handling Ack | Status | 554 TIA-41 redreq 756 | Status |
|---|---|---|---|
| – | – | – | – |

NETWORK INTERWORKING THROUGH MESSAGE TRANSLATION

BACKGROUND

The invention is related to the art of network interworking. The invention will be described in terms of interworking between networks of the Global System for Mobile Communication (GSM) and (Telecommunications Industry Association) TIA-41 Mobile Application Part (MAP) protocols. However, the invention may be applicable in other interworking or message translation applications.

A number of mobile communication technologies exist. For example, a technology known as the Global System for Mobile Communication (GSM) is widely deployed in Europe. In North America, mobile networks implementing the TIA-41 protocol predominate. This development of multiple standards has led to certain inefficiencies. For example, electronic devices, such as cellular phones, laptop computers and personal digital assistants, must be designed and manufactured to communicate with networks based on one of the protocols. The market for such devices is reduced because customers served by another standard are removed as potential customers. Alternatively, the devices can be manufactured to communicate with two or more of the communication network protocols. However, this can adversely affect the development time, size and production costs of these devices.

This has led to efforts to unify communication networks, or at least provide means for interworking between networks. For example, the GSM/ANSI-136 Interoperability Team (GAIT) has promulgated standards for TIA-41-GSM interworking. The GAIT standards address roaming scenarios for mobile communications subscribers that allow the subscribers to move between GSM and TIA-41 networks. New Gateway devices including Interworking and Interoperability Functions (IIF) have been developed to provide for interworking between networks. However, the GAIT standards do not address the interworking problems that exist where an originating Mobile Switching Center (MSC) is in a different realm (TIA-41 vs. GSM MAP) from a subscriber's Home Location Register (HLR). There is no provision, for example, for allowing a TIA-41-based Mobile Switching Center (MSC) to communicate with a GSM-based HLR for the purposes of location query and call setup.

This deficit in Mobile Application Part (MAP) interworking makes it difficult for mobile communications service providers to use more than one technology in their networks. Therefore, there is desire for an Inter Technology Bridge (ITB) to interface messages between these disparate protocols.

SUMMARY

A method operative to assist in a termination of a call when an originating MSC based on a first standard requests the location of a subscriber from an HLR that is based on a second standard includes receiving a location request in a first standard format from the originating MSC, generating a location request in a second standard format based on the received location request, transmitting the generated location request to the HLR, receiving a location request acknowledgement in the second standard format from the HLR, generating a location request acknowledgement in the first standard format based on the received location request acknowledgement, and transmitting the generated location request acknowledgement to the originating MSC.

The method can also include receiving a call redirection request in the second standard format from a serving MSC, generating a call redirection request in the first standard format based on the received call redirection request, transmitting the generated call redirection request to the originating MSC, receiving a call redirection information request in the first standard format from the originating MSC, generating a call redirection information request in the second standard format based on the received call redirection information request, transmitting the generated call redirection information request to the HLR, receiving a call redirection information request acknowledgement in the second standard format from the HLR, generating a call redirection information request acknowledgement in the first standard format based on the call redirection information request acknowledgement, and transmitting the generated call redirection information request acknowledgement to the originating MSC.

Additionally, the method can include receiving a call redirection request acknowledgement in the first standard format from the originating MSC, generating a call redirection request acknowledgement in the second standard format based on the received call redirection request acknowledgement, and, transmitting the generated call redirection request acknowledgement to the serving MSC.

For example, the location request in the first standard format can take the form of a LOCREQ message in a TIA-41 format. The location request in the second standard format can include an SRI message in a GSM format. The call redirection request in the second standard format can include a Resume Call Handling message in the GSM format. The call redirection request in the first standard format can include a REDREQ message in the TIA-41 format. The redirection information request in the first standard format can include a TRANUMREQ message in the TIA-41 format. The call redirection information request in the second standard format can include an SRI message in the GSM format. The call redirection request acknowledgement in the first standard format can include a redreq return result message in the TIA-41 format. The call redirection request acknowledgement in the second standard format can include a Resume Call Handling Ack message in the GSM format.

Additionally, or alternatively, the location request in the first standard format can include an SRI message in the GSM format. The location request in a second standard format can include a LOCREQ message in the TIA-41 format. The call redirection request in the second standard format can include a REDREQ message in the TIA-41 format. The call redirection request in the first standard format can include a Resume Call Handling message in the TIA-41 format. The call redirection information request in the first standard format can include an SRI message in the GSM format. The call redirection information request in the second standard format can include generating a TRANUMREQ message in the TIA-41 format. The call redirection request acknowledgement in the first standard format can include receiving a Resume Call Handling message in the TIA-41 format. The call redirection request acknowledgement in the second standard format can include a redreq return result message in the TIA-41 format.

One set of embodiments are methods operative to assist in a termination of a call when a TIA-41 based originating MSC requests a location of a subscriber from a GSM based HLR. The methods includes receiving a LOCREQ message from the TIA-41 based originating MSC, generating an SRI message based on the LOCREQ message, transmitting the SRI message to the GSM based HLR, receiving an SRI Ack message from the GSM based HLR including an MSRN, generating a locreq return result message including a TLDN based on the SRI Ack message and the MSRN, and transmitting the locreq return result message including the TLDN to the TIA-41 based MSC.

Some embodiments further include receiving a Resume Call Handling message from a GSM based serving MSC, generating REDREQ message based on the Resume Call Handling message, transmitting the REDREQ message to the TIA-41 based originating MSC, receiving a TRANUMREQ message from the TIA-41-based originating MSC, generating an SRI message based on the TRANUMREQ message, transmitting the SRI message to the GSM based HLR, receiving an SRI Ack message from the GSM based HLR, generating a tranumreq return result message based on the SRI Ack message, and transmitting the tranumreq return result message to the TIA-41 based originating MSC.

Some embodiments further include receiving a redreq return result message from the TIA-41 based originating MSC, generating a Resume Call Handling Ack message based on the redreq return result message, and, transmitting the Resume Call Handling Ack message to the GSM based serving MSC.

Another set of embodiments include methods operative to assist in a termination of a call when an GSM based originating MSC requests a location of a subscriber from a TIA-41 based HLR. The methods include receiving an SRI message from the GSM based originating MSC, generating an LOCREQ message based on the SRI message, transmitting the LOCREQ message to the TIA-41 based HLR, receiving an locreq return result message from the TIA-41 based HLR including a TLDN, generating an SRI Ack message including an MSRN based on the locreq return result message and the TLDN, and transmitting the SRI Ack message including the MSRN to the GSM based originating MSC.

Some of those embodiments include receiving a REDREQ message from a TIA-41 based serving MSC, generating Resume Call Handling message based on the REDREQ message, transmitting the Resume Call Handling message to the GSM based originating MSC, receiving an SRI message from the GSM based originating MSC, generating a TRANUMREQ message based on the SRI message, transmitting the TRANUMREQ message to the TIA-41 based HLR, receiving a tranumreq return result message from the TIA-41 based HLR, generating an SRI Ack message based on the tranumreq return result message, and transmitting the SRI Ack message to the GSM based originating MSC.

Some embodiments include receiving a Resume Call Handling Ack message from the GSM based originating MSC, generating a redreq return result message based on the Resume Call Handling Ack message, and transmitting the redreq return result message to the TIA-41 based serving MSC.

An apparatus operative to assist in a termination of a call when an originating MSC based on a first standard requests the location of a subscriber from an HLR that is based on a second standard includes means for receiving a location request in a first standard format from the originating MSC, means for generating a location request in a second standard format based on the received location request, means for transmitting the generated location request to the HLR, means for receiving a location request acknowledgement in the second standard format from the HLR, means for generating a location request acknowledgement in the first standard format based on the received location request acknowledgement, and means for transmitting the generated location request acknowledgement to the originating MSC.

Some embodiments further include means for receiving a call redirection request in the second standard format from a serving MSC, means for generating a call redirection request in the first standard format based on the received call redirection request, means for transmitting the generated call redirection request to the originating MSC, means for receiving a call redirection information request in the first standard format from the originating MSC, means for generating a call redirection information request in the second standard format based on the received call redirection information request, means for transmitting the generated call redirection information request to the HLR, means for receiving a call redirection information request acknowledgement in the second standard format from the HLR, means for generating a call redirection information request acknowledgement in the first standard format based on the call redirection information request acknowledgement, and means for transmitting the generated call redirection information request acknowledgement to the originating MSC.

Some of those embodiments include means for receiving a call redirection request acknowledgement in the first standard format from the originating MSC, means for generating a call redirection request acknowledgement in the second standard format based on the received call redirection request acknowledgement, and means for transmitting the generated call redirection request acknowledgement to the serving MSC.

One embodiment is an inter technology bridge. The inter technology bridge includes a mobile application part protocol translator operative to receive a message in a first mobile application part protocol, and translate the message to a corresponding message in a second mobile application part protocol.

Some embodiments include a database operative to provide subscriber information to the mobile application part protocol translator, the mobile application part protocol translator being further operative to use the provided subscriber information to generate a parameter associated with the corresponding message in the second mobile application part protocol.

Alternatively or additionally, some embodiments include a database operative to provide configuration information to the mobile application part protocol translator, the mobile application part protocol translator being further operative to use the provided configuration information to generate a parameter associated with the corresponding message in the second mobile application part protocol.

For example, the mobile application part protocol translator can be operative to receive a message in a TIA-41 mobile application part protocol and translate the message to a corresponding message in a GSM mobile application part protocol. Additionally, or alternatively, the mobile application part protocol translator can be operative to receive a message in a GSM mobile application part protocol and translate the message to a corresponding message in a TIA-41 mobile application part protocol.

BRIEF DESCRIPTION OF THE DRAWINGS

The invention may take form in various components and arrangements of components, and in various procedures and arrangements of procedures. The drawings are only for purposes of illustrating preferred embodiments, they are not to scale, and are not to be construed as limiting the invention.

DETAILED DESCRIPTION

Figure 1:
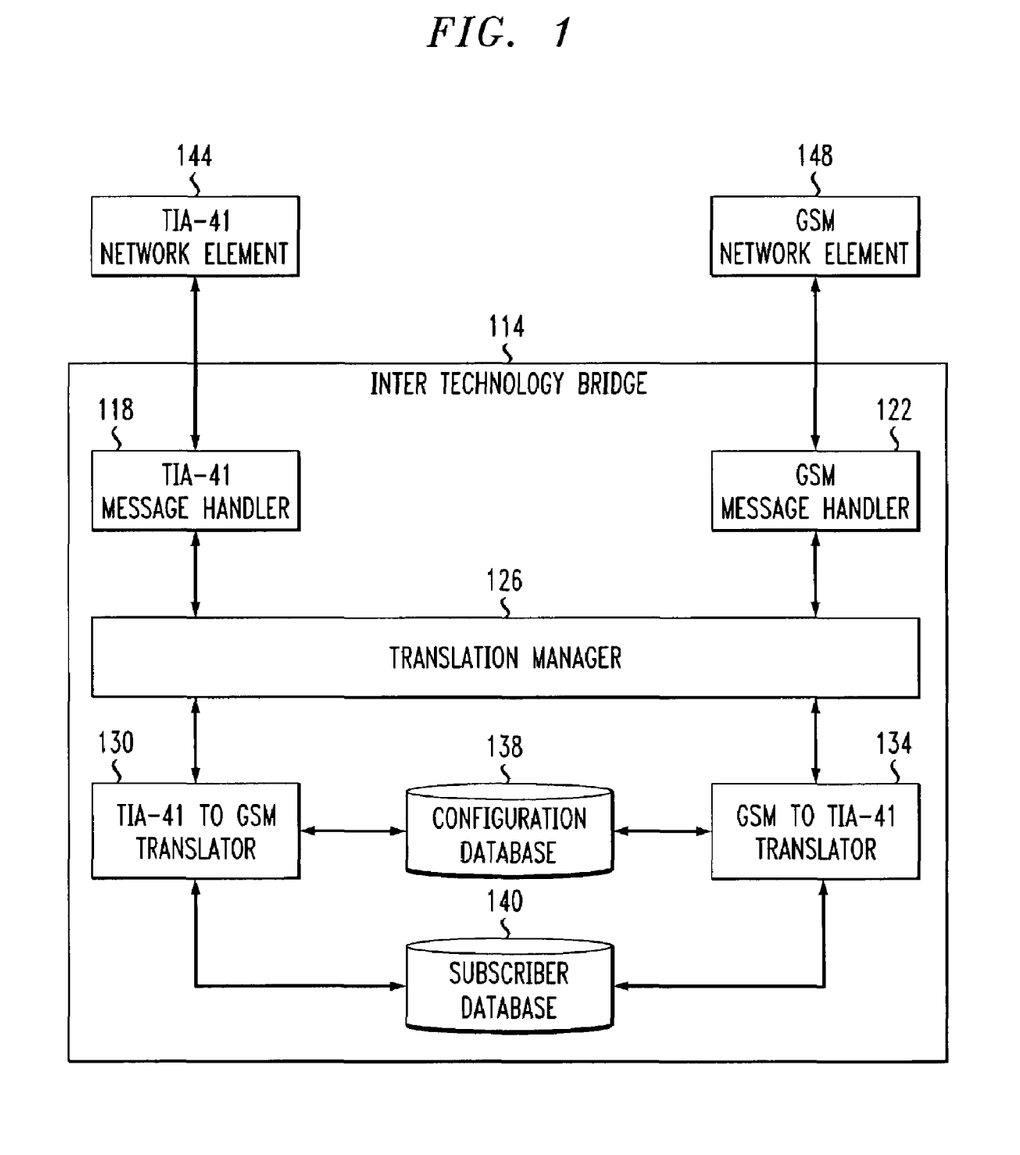
FIG. 1 is a block diagram of an embodiment of an inter technology bridge.

Referring to FIG. 1, an Inter Technology Bridge (ITB) 114 operative to interwork messages between a first protocol network and a second protocol network includes a first protocol message handler 118, a second protocol message handler 122, a translation manager 126, a first direction protocol translator 130, a second direction protocol translator 134, a configuration database 138, and a subscriber database 140. The first protocol message handler 118 provides connectivity to a first protocol network element 144. The second protocol message handler 122 provides connectivity to a second protocol network element 148.

For example, the first protocol message handler 118 is a TIA-41 MAP message handler and the second protocol message handler 122 is a GSM MAP message handler. The first direction protocol translator 130 can be, for example, a TIA-41 to GSM translator, and the second direction protocol translator 134 can be a GSM to TIA-41 translator. Of course, some embodiments include a single protocol translator that translates messages in two or more directions.

The TIA-41 message handler 118 is an interface between the Inter Technology Bridge 114 and the first protocol or TIA-41 network element 144. The TIA-41 message handler 118 may include physical layer connectivity between the ITB 114 and a TIA-41 network element 144. Alternatively, or additionally, the TIA-41 message handler 118 provides layer 2 services, packaging payloads with appropriate addressing and control headers.

The second protocol or GSM message handler 122 provides similar services for communicating between the Inter Technology Bridge 114 and the second or GSM network element 148.

The Translation Manager 126 orchestrates message processing within the ITB 114. The Translation Manager receives messages from the first or TIA-41 message handler 118 and delivers them to the first direction or TIA-41 to GSM translator 130. The Translation Manager 126 also receives messages from the second protocol or GSM message handler 122 and delivers them to the second direction or GSM to TIA-41 translator 134. The Translation Manager 126 receives converted or translated messages from the first direction or TIA-41 to GSM translator 130 and delivers them to the second protocol or GSM message handler 122. The translation manager 126 also receives converted or translated messages from the second direction or GSM to TIA-41 translator 134 and delivers them to the first protocol or TIA-41 message handler 118. The translation manager 126 may also access the databases 138, 140 (directly or indirectly) in order to provide message routing information to the message handlers 118, 122.

The first direction or TIA-41 to GSM translator 130 converts or translates messages in a first protocol (e.g., TIA-41) to messages associated with a second protocol (e.g., GSM). For example, the TIA-41 to GSM translator 130 converts TIA-41 MAP messages to GSM MAP messages. In the Mobile Application Parts (MAP) of TIA-41 and GSM, there is a one-to-one correspondence between possible messages. That is, for each input MAP message in TIA-41, there is a corresponding output MAP message in GSM (see FIG. 3). However, each message is associated with a set of attributes or parameters. In some instances, a required or mandatory parameter in the second protocol (e.g., GSM) has no corresponding parameter associated with an input message from the first protocol (e.g., TIA-41). In those instances, the first direction or TIA-41 to GSM translator 130 accesses the configuration database 138 and/or subscriber database 140 to generate the needed attribute or parameter.

The second direction or GSM to TIA-41 protocol translator 134 performs similar conversion or translation services as the first direction or TIA-41 to GSM translator 130. However, the conversions or translations are in the opposite direction. For example, the GSM to TIA-41 translator 134 translates or converts message in the second protocol (e.g., GSM) to messages in the first protocol (e.g., TIA-41). The one-to-one mapping between messages illustrated in FIG. 3 applies to messages translated or converted by the GSM to TIA-41 translator 134 (see FIG. 6). Additionally, there can be parameters that must be supplied in the output or transmitted message that cannot be generated from information provided in the attributes associated with the input message alone. In these cases, the second direction or GSM to TIA-41 protocol translator 134 uses information stored in the configuration database 138 or subscriber database 140 to generate the required parameters.

Additionally, the translators 130, 134 may store information received in a first message in one of the databases 138, 140. In some instances, the stored information can be used in the translation of a second message.

Figure 2:
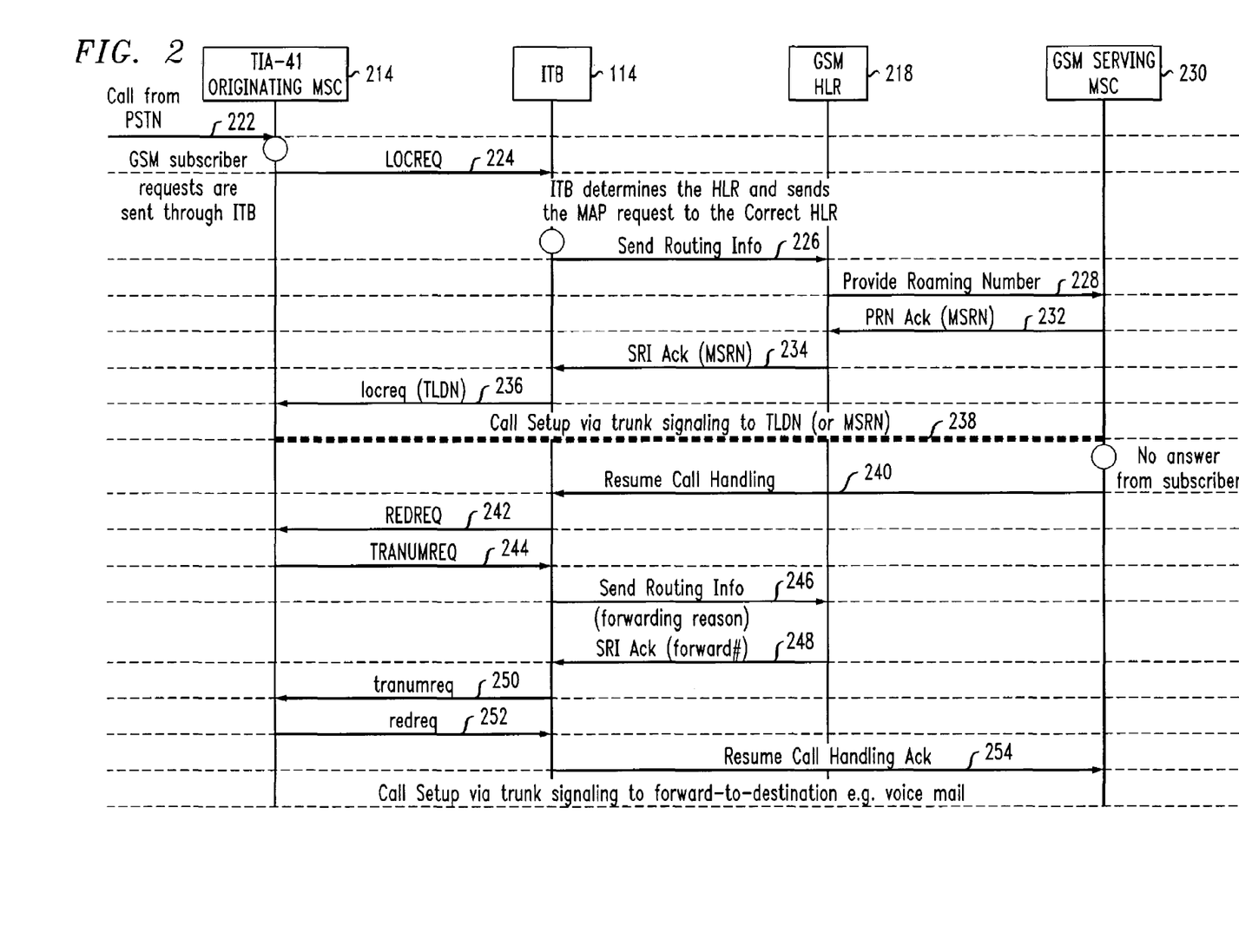
FIG. 2 is a call flow diagram illustrating a first exemplary application of an inter technology bridge.

Referring to FIG. 2, in a first exemplary application, the first or TIA-41 network element 144 is a TIA-41 mobile switching center (MSC) 214 and the second protocol or GSM network element 148 is a GSM-based Home Location Register (HLR) 218. The ITB 114 translates messages between the TIA-41-based MSC 214 and the GSM-based HLR 218.

For example, when a call 222 arrives at the TIA-41 MSC 214 from, for example, the Public Switched Telephone Network (PSTN), the TIA-41 MSC 214 may determine that the called party or subscriber belongs to, or has a mobile phone associated with, a GSM network. In that case, the TIA-41 MSC initiates a query to the GSM network in order to get routing information to complete the call to the called party or subscriber (B subscriber). The query, a TIA-41 LOCREQ message 224, is routed through the Inter Technology Bridge 144. The first protocol or TIA-41 message handler 118 receives the message and passes it to the translation manager 126. The translation manager 126 passes the message to the first direction or TIA-41 to GSM protocol translator 130. As will be explained in greater detail below, the TIA-41 to GSM translator 130 translates the LOCREQ message to a Send Routing Information message (SRI) 266 that is compatible with the GSM network. The SRI message is passed to the translation manager 126 which, in turn, directs the message to the GSM message handler 122. The GSM message handler 122 packages the message and directs it to the appropriate GSM-based HLR 218. Attributes or parameters associated with the LOCREQ message 224 (e.g., Digits (Dialed)) are used by the ITB 114 to determine the appropriate HLR to which to route the SRI message. For example, the translation manager may use one or more of the parameters to generate a key into one of the databases 138, 140 to find the appropriate HLR.

In order to respond to the SRI 226, the GSM HLR 218 generates a Provide Roaming Number message 228 and directs it to a GSM-based serving MSC 230 currently associated with the called party or subscriber. The GSM-based serving MSC 230 responds with a Provide Roaming Number Acknowledge message (PRN Ack) 232 including a mobile station roaming number (MSRN). The PRN Ack message 232 is directed at the GSM HLR 218. The GSM HLR 218 generates a GSM-based SRI Ack message 234 including the MSRN and directs it to the Inter Technology Bridge 114. The second protocol or GSM message handler 122 receives the SRI Ack message 234 and passes it to the translation manager 126. The translation manager 126 directs the SRI Ack message to the GSM to TIA-41 translator 134 which converts or translates it to (as will be described in greater detail below) a TIA-41-based locreq return result 236 including a Temporary Local Directory Number (TLDN). The locreq return result 236 is directed to the TIA-41-based MSC 214 as a response to the LOCREQ query 224. The TIA-41-based MSC 214 then sets up 238 the call via trunk signaling.

If for some reason, such as, for example, the subscriber doesn't answer, or the subscriber's cell phone is busy, the call setup 238 is unsuccessful, the GSM-based serving MSC 230 may transmit a Resume Call Handling message 240 to the Inter Technology Bridge 114. The Resume Call Handling message 240 is received by the GSM message handler 122 and is directed to the translation manager 126 which routes the Resume Call Handling message 240 to the GSM to TIA-41 translator 134. As will be described in greater detail below, the GSM to TIA-41 translator 134 converts or translates the Resume Call Handling message 240 to a TIA-41 REDREQ (Redirection Request) message 242. The REDREQ message 242 is passed to the translation manager 126 which, in turn, directs it to the TIA-41 message handler 118. The TIA-41 message handler 118 transmits the RFDREQ message 242 to the TIA-41-based originating MSC 214. The REDREQ message 242 is a redirection request suggesting the TIA-41 MSC attempt to route the call 222 to a second number, such as a voice mail service or other forwarding number.

In order to redirect the call 222, the originating TIA-41 MSC 214 must retrieve a new number to which to direct the call 222. Therefore, the originating TIA-41 MSC 214 generates a TIA-41 TRANUMREQ (Transfer Number Request) message 244 and transmits it to the Inter Technology Bridge 114. The TIA-41 message handler 118 receives the TRANUMREQ message 244 and transfers it to the translation manager 126. The translation manager directs the message to the TIA-41 to GSM translator 130. As will be explained in greater detail below, the TIA-41 to GSM translator 130 converts or translates the TRANUMREQ message 244 into a GSM-based Send Routing Info message 246. The Send Routing Info (SRI) message 246 is transmitted to GSM-based HLR 218 of the called party or subscriber. The SRI message 246 includes a forwarding reason parameter. The forwarding reason indicates to the GSM HLR 218 that a forwarding number, perhaps appropriate to the forwarding reason, is desired. The GSM HLR generates a GSM-base SRI Ack message 248 including a forwarding number. The SRI Ack message 248 is directed to the ITB 114. The GSM message handler 122 receives the SRI Ack message 248 and delivers it to the translation manager 126. The translation manager 126 directs the SRI Ack message 248 to the GSM to TIA-41 translator 134. As will be explained in greater detail below, the GSM to TIA-41 translator 134 converts or translates the SRI Ack message 248 into a TIA-41-based tranumreq return result 250. The originating TIA-41-based MSC 214 generates a redreq return result 252 as an acknowledgement of the REDREQ message 242. The redreq return result 252 is directed to the ITB 114. The TIA message handler 118 receives the redreq return result message 252 and passes it to the translation manager 126. The translation manager 126 directs the redreq return result message 252 to the TIA-41 to GSM translator 130 which translates it to a GSM-based Resume Call Handling Ack message 254. The Resume Call Handling Ack message 254 is sent to the serving GSM-based MSC 230 as a response to the Resume Call Handling message 240 sent by the GSM-based serving MSC 230.

Figure 3:
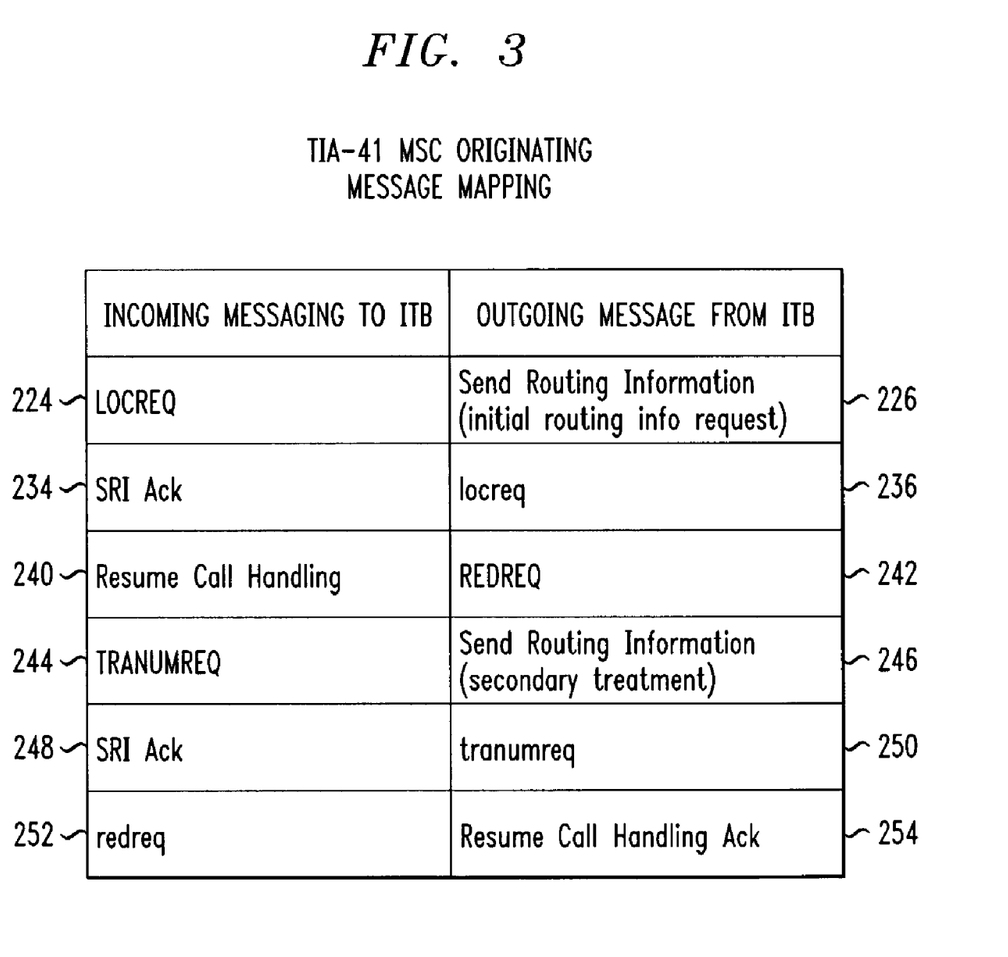
FIG. 3 is a table summarizing the messages translated by the inter technology bridge in the first exemplary application of FIG. 1.

FIG. 3 summarizes the translations performed by the Inter Technology Bridge 114 in the first exemplary application of FIG. 2. As explained above, the TIA-41 LOCREQ message 224 is translated to a GSM Send Routing Information message 226. The GSM SRI Ack message 234 is translated to the ASNI-41 lockreq message 236. The GSM Resume Call Handling message 240 is translated to the TIA-41 REDREQ message 242. The TIA-41 TRANUMREQ 244 is translated to the GSM message Send Routing Information 246. The GSM message SRI Ack 248 is translated to the TIA-41 message tranumreq 250. The TIA-41 redreq message 252 is translated to the GSM message Resume Call Handling Ack 254.

It will be noted that in a first instance, an SRI Ack message (234) is translated to a TIA-41 locreq return result message 236, and in a second instance, an SRI Ack message (248) is translated to a TIA-41 tranumreq return result message 250. The ITB 144 determines which way to translate an SRI Ack message either by stored context information (i.e., the messages associated with a particular call 222 that have been processed recently) or from parameters associated with the SRI Ack message.

Figure 4:
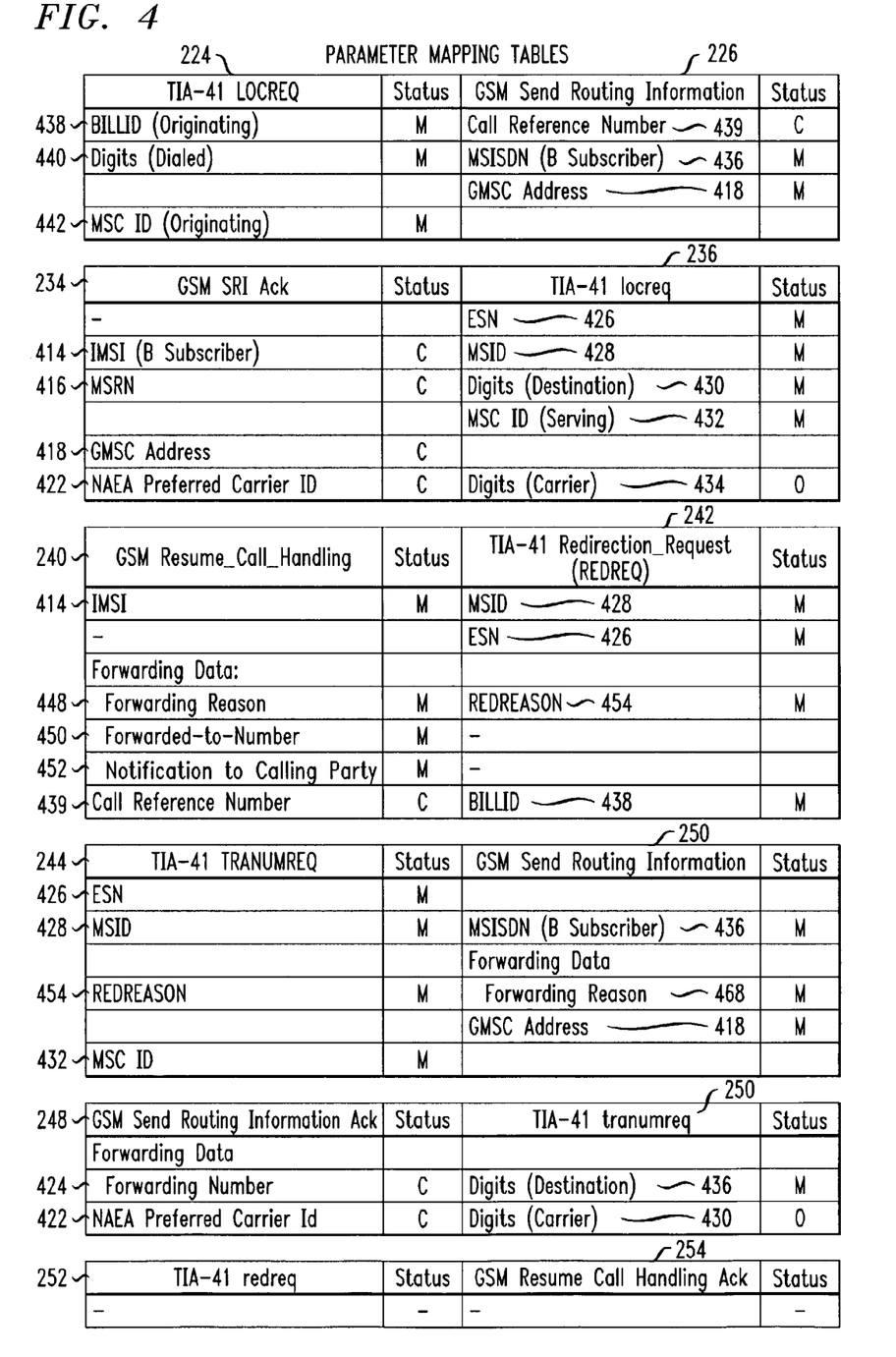
FIG. 4 is a set of tables outlining some of the parameters received and generated in association with the messages of FIG. 3.

For example, referring to FIG. 4, in the first instance, the SRI Ack message 234 is associated with an International Mobile Subscriber Identity (IMSI) 414, a Mobile Station Roaming Number (MSRN) 416, a GSM Mobile Switch Address (GMSC) 418, and a North American Equal Access Preferred Carrier ID (NAEA) 422. These attributes or parameters 414, 416, 418, 422 are generally considered conditional (status C). However, in this scenario, they are mandatory.

In the second instance, the Send Routing Information message 248 is associated with parameters including forwarding data, such as, a forwarding number 424 and the NAEA Preferred Carrier ID 422.

In the first instance, the ITB 114 recognizes that the SRI Ack message 234 should be translated to a locreq return result 236 because of the parameters 414, 416, 418 associated with the SRI Ack message 234. In generating the locreq return result 236, the ITB 114 must generate mandatory (status M) locreq return result parameters. The mandatory parameters include an Electronic Serial Number (ESN) 426, a Mobile Station Identifier (MSID) 428, Destination Digits 430 and a Mobile Switching Center ID (MSC ID) 432 for the serving MSC. Optionally, the locreq return result message may include digits 343 associated with a carrier. The MSID 428 and Destination Digits 430 of the locreq return result 236 are generated from information contained within the IMSI 414 and MSRN 416 parameters of the SRI Ack message 234. In order to generate the ESN parameter 426, the GSM to TIA-41 translator 134 of the ITB 114 accesses the subscriber database 140 using information from the parameters (e.g., IMSI 414)

of the SRI Ack message 234 to generate a key into the database 140. Similarly, the GSM to TIA-41 translator 134 retrieves information from the configuration database 138 in order to generate the MSC ID 432 of the serving switching center 230. For example, the MSC ID may have been stored in the configuration database 138 when the LOCREQ message 224 was translated.

In the second instance, the ITB 114 simply uses the forwarding number 424 associated with the SRI message 248 to generate destination digits 436 for the tranumreq return result message 250. Again, optionally, the ITB includes carrier digits 434 in the generated TIA-41 tranumreq return result message 250.

The remaining messages (and associated parameters) are processed in a similar manner. For instance, the LOCREQ message 224 is associated with a BILLID 438 parameter, Dialed Digits 440 and an MSC ID 442 for the originating MSC 214. The TIA-41 to GSM translator 130 generates a Call Reference Number 439 parameter and associates it with the BILLID 438 parameter in a temporary stored device or call record. The TIA-41 to GSM translator 130 uses the Dialed Digits parameter 440 to generate a Mobile Station International ISDN Number (MSISDN) 444 in reference to the called party or B subscriber. The TIA-41 to GSM translator 130 of the ITB 114 generates the GMSC Address parameter 418. The GMSC Address 418 can be a dummy or place holding parameter. The GMSC Address 418 may be stored in a temporary call record for use in the translation of other messages (such as TRANUMREQ 244 message). The generated parameters are transmitted in association with the output SRI message 226.

The Resume Call Handling message 240 includes the IMSI 414 and forwarding data including a Forwarding Reason 448, a Forwarded-To-Number 450 and a Notification To Calling Party parameter 452. When translating the RCH message 240 to the REDREQ message 242, the ITB 114 generates or accesses the MSID 428 and ESN 426 parameters as explained above. Additionally, the ITB 114 reformats the GSM-based Forwarding Reason 448 into a TIA-41-based REDREASON parameter 454. The BILLID parameter 438 is generated or accessed with information from a Call Reference Number parameter 439. For example, the Call Reference Number parameter 439 is used as an index or key into the temporary storage device or call record (not shown) that was used to store the BILLID 438 during the processing of the LOCREQ message 224. The BILLID parameter is transmitted along with the output REDREQ message 242.

The TRANUMREQ message 244 carries with it the ESN 426 and MSID 428 parameters as well as the redirection reason (REDREASON) 454 and MSC ID 432. In translating the TRANUMREQ message 244, the ITB 114 uses the MSID 428 to generate (or access via a database dip) an MSISDN 458 for the called or B subscriber. The TIA-41-based REDREASON 454 is reformatted into a GSM-based Forwarding Reason 460. The TIA-41 to GSM translator 130 uses the ESN 426 and/or MSID 428 to generate a key into the configuration database 138 or temporary call record in order to access the GMSC Address 418. The generated parameters 458, 468, 470 are transmitted along with the output SRI message 246.

The TIA-41 redreq message 252 includes no parameters of interest and is simply translated into the GSM-based Resume Call Handling Ack message 254, which also includes no parameters of interest.

Figure 5:
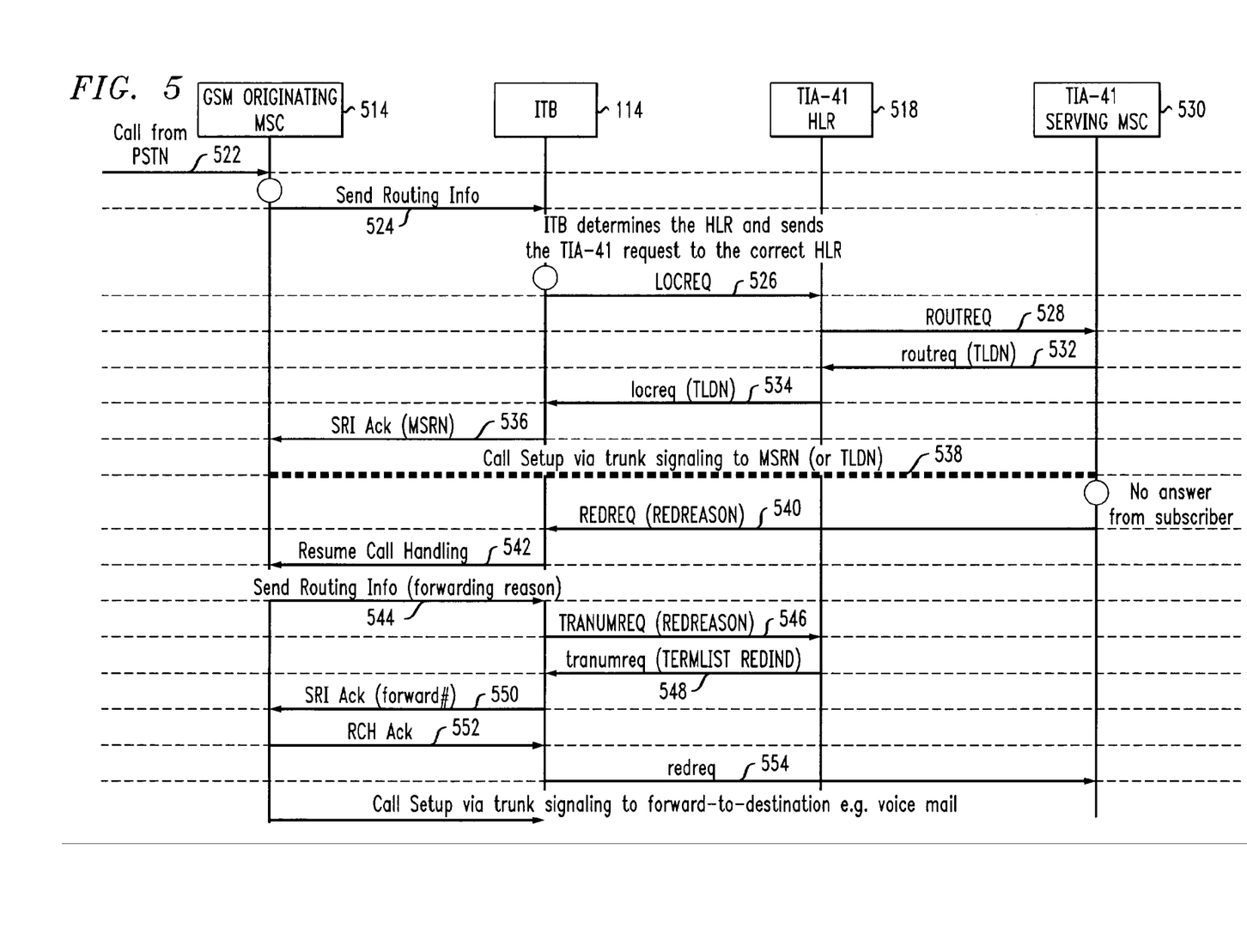
FIG. 5 is a call flow diagram illustrating a second exemplary application of an inter technology bridge.

Referring to FIG. 5, in a second exemplary application, the first protocol or TIA-41 network element 144 is a TIA-41-based HLR 518 and the second protocol or GSM network element 148 is a GSM-based MSC (HLR) 514. The ITB 114 translates messages between the TIA-41-based HLR 518 and the GSM-based MSC 514.

For example, when a call 522 arrives at the GSM MSC 514 from, for example, the Public Switched Telephone Network (PSTN), the GSM MSC 514 determines that the called party or subscriber belongs to, or has a mobile phone associated with, a TIA-41-based network. Therefore, the GSM MSC 514 initiates a query to the TIA-41 network in order to get routing information to complete the call to the called party or subscriber. The query, an SRI message 524, is routed through the Inter Technology Bridge 144. The second protocol or GSM message handler 122 receives the message and passes it to the translation manager 126. The translation manager 126 passes the message to the second direction or GSM to TIA-41 protocol translator 134. As will be explained in greater detail below, the GSM to TIA-41 translator 134 translates the SRI message to a LOCREQ (Location Request) 526 that is compatible with the TIA-41 network. The LOCREQ message 526 is passed to the translation manager 126 which, in turn, directs the message to the TIA-41 message handler 118. The TIA-41 message handler 118 packages the message and directs it to the TIA-41-based HLR 518. Parameters in the SRI message 524 (e.g., MSISDN (B Subscriber) 714) are used by the ITB 114 to determine the appropriate HLR to which to route the LOCREQ message 526.

In order to respond to the LOCREQ 526, the TIA-41 HLR 518 generates a ROUTREQ (Route Request) message 528 and directs it to a TIA-41-based serving MSC 530 currently associated with the called party or subscriber (B subscriber). The TIA-41-based serving MSC 530 responds with a routreq return result 532 including a TLDN. The routreq return result message 532 is directed at the TIA-41 HLR 518. The TIA-41 HLR 518 generates a TIA-41-based locreq return result 534 including the TLDN and directs it to the Inter Technology Bridge 114. The first protocol or TIA-41 message handler 118 receives the locreq return result 534 and passes it to the translation manager 126. The translation manager 126 directs the locreq return result to the TIA-41 to GSM translator 130 which converts or translates it to (as will be described in greater detail below) to a corresponding GSM-based SRI Ack message 536 including an MSRN. The SRI Ack message 536 is directed to the GSM-based MSC 514 as a response to the SRI query 524. The GSM-based MSC 514 then sets up 538 the call via trunk signaling.

If, for some reason, the call setup 538 is unsuccessful, the TIA-41-based serving MSC 530 may transmit a REDREQ message (Redirection Request) 540 to the Inter Technology Bridge 114. The REDREQ message 540 is received by the TIA-41 message handler 118 and directed to the translation manager 126 which routes the REDREQ message 540 to the TIA-41 to GSM translator 130. As will be described in greater detail below, the TIA-41 to GSM translator 130 converts or translates the REDREQ message 540 to a GSM Resume Call Handling message 542. The Resume Call Handling message 542 is passed to the translation manager 126 which, in turn, directs it to the GSM message handler 122. The GSM message handler 122 transmits the Resume Call Handling message 542 to the GSM-based originating MSC 514. The Resume Call Handling message 542 is a redirection request suggesting the GSM MSC 514 attempt to route the call 522 to a second number, such as a voice mail service or other forwarding number.

In order to redirect the call 522, the originating GSM MSC 514 must retrieve a new number to which to direct the call 522. Therefore, the originating GSM MSC 514 generates a GSM SRI message 544 and transmits it to the Inter Technology Bridge 114. The GSM message handler 122 receives the SRI message 544 and transfers it to the translation manager 126. The translation manager directs the message to the GSM to TIA-41 translator 134. As will be explained in greater detail below, the GSM to TIA-41 translator 134 converts or translates the SRI message 544 into a TIA-41-based TRANUMREQ message 546. The TRANUMREQ message 546 is transmitted to the TIA-41-based HLR 518 of the called party or subscriber. The TRANUMREQ message 546 includes a redirection reason (REDREASON) parameter. The redirection reason indicates to the TIA-41 HLR 518 that a forwarding number, perhaps appropriate to the redirection reason, is desired. The TIA-41 HLR 518 generates a TIA-41-based tranumreq return result 548 including a forwarding number (within a TERMLIST parameter). The tranumreq return result message 548 is directed to the ITB 114. The TIA-41 message handler 118 receives the tranumreq return result message 548 and delivers it to the translation manager 126. The translation manager 126 directs the tranumreq return result message 548 to the TIA-41 to GSM translator 130. As will be explained in greater detail below, the TIA-41 to GSM translator 130 converts or translates the tranumreq return result message 548 into a GSM-based SRI Ack message 550. The originating GSM-based MSC 514 generates an RCH Ack 552 as an acknowledgement of the Resume Call Handling message 542. The RCH Ack 552 is directed to the ITB 114. The GSM message handler 122 receives the RCH Ack 552 and passes it to the translation manager 126. The translation manager 126 directs the RCH Ack 552 to the GSM to TIA-41 translator 134 which translates it to a TIA-41-based redreq return result 554. The redreq return result 554 is sent to the serving TIA-41-based MSC 530 as a response to the REDREQ message 540 sent by the TIA-41-based serving MSC 530.

Figure 6:
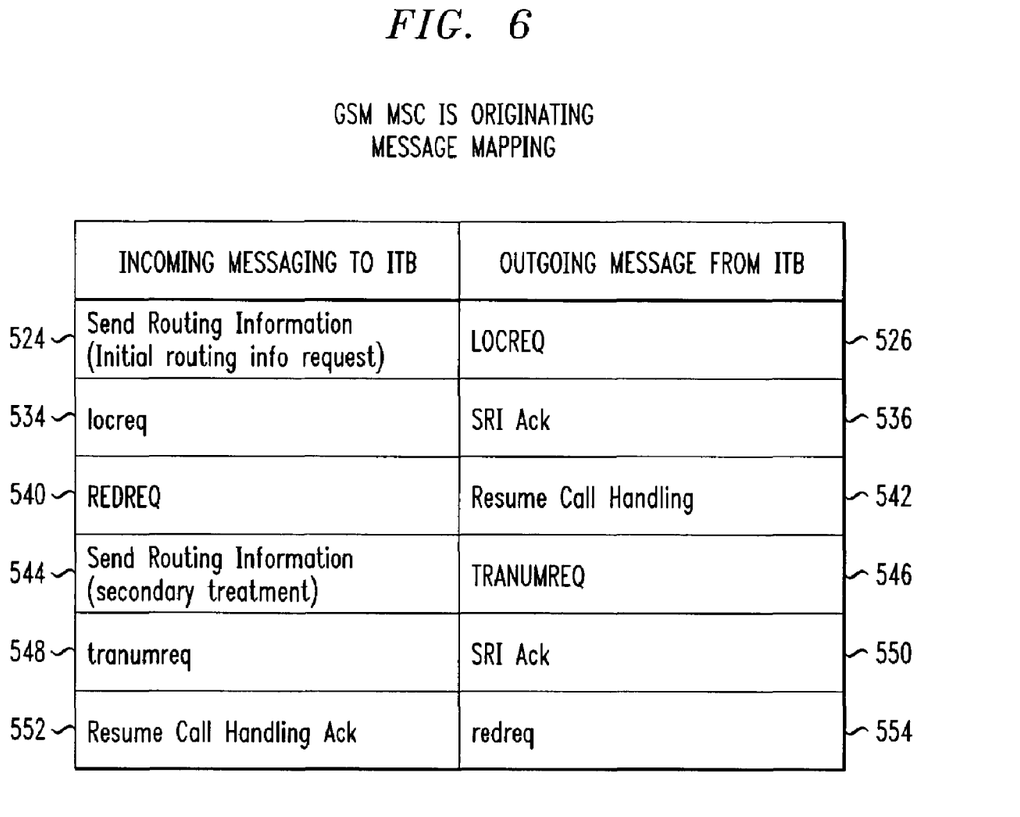
FIG. 6 is a table summarizing the messages translated by the inter technology bridge in the second exemplary application of FIG. 5.

FIG. 6 summarizes the translations performed by the Inter Technology Bridge 114 in the second exemplary application of FIG. 5. As explained above, the GSM SRI message 524 is translated to a TIA-41 LOCREQ message 526. The TIA-41 locreq return result 534 is translated to the GSM SRI Ack message 536. The TIA-41 REDREQ message 540 is translated to the GSM Resume Call Handling message 542. The GSM SRI 544 is translated to the TIA-41 TRANUMREQ message 546. The TIA-41 tranumreq return result 548 is translated to the GSM message SRI Ack 550. The TIA-41 Resume Call Handling Ack message 552 is translated to the TIA-41 redreq return result 554.

It will be noted that in a first instance, an SRI message (520) is translated to a TIA-41 LOCREQ message 526, and in a second instance, an SRI message (544) is translated to a TIA-41 TRANUMREQ message 546. As was described above in reference to SRI Ack messages 234, 238, the ITB 144 determines which way to translate an SRI message either by stored context information (i.e., the messages associated with a particular call 522 that have been recently processed) or from parameters associated with the SRI message.

Figure 7:
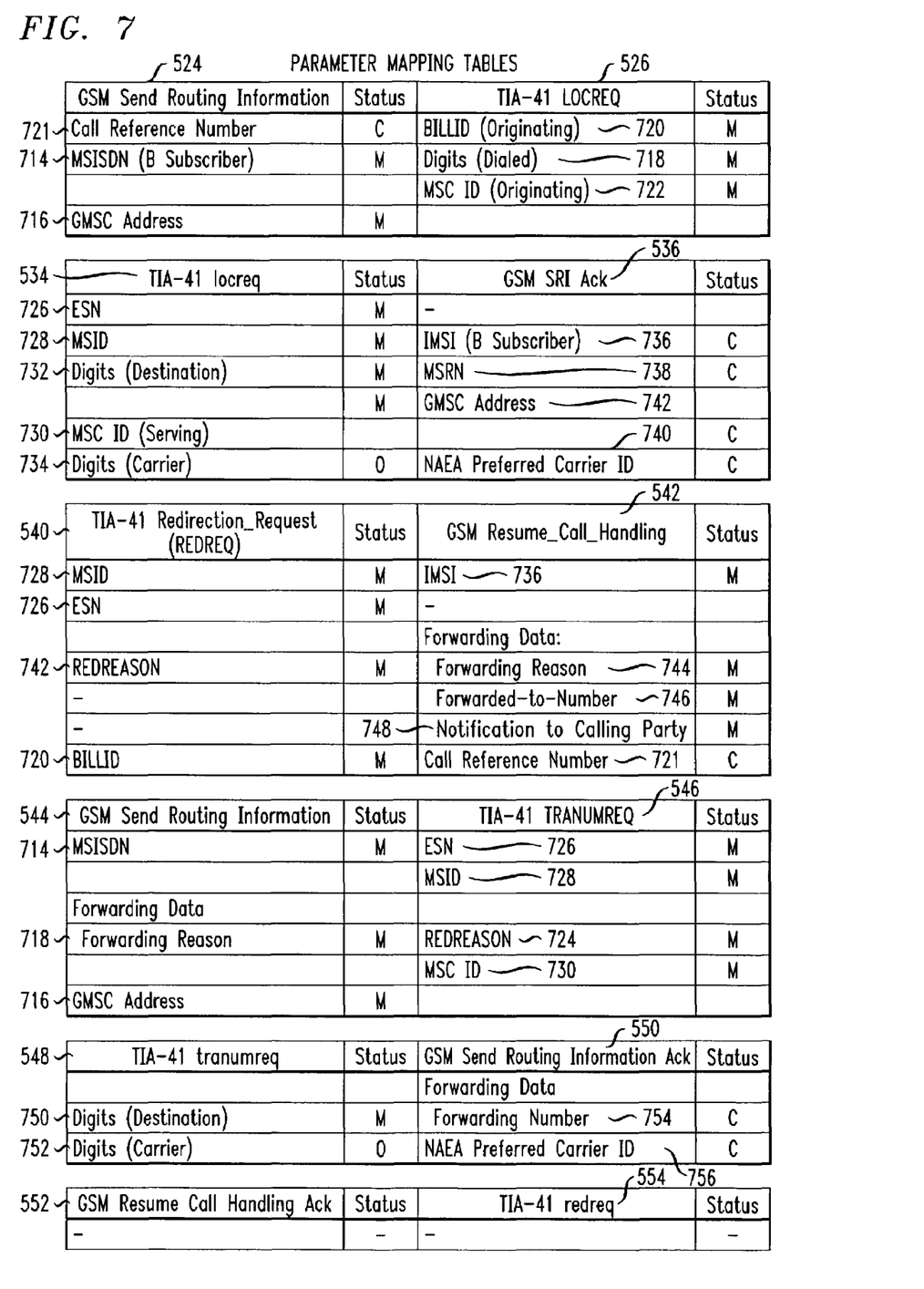
FIG. 7 is a set of tables outlining some of the parameters received and generated in association with the messages of FIG. 6.

For example, referring to FIG. 7, in the first instance, the SRI message 524 is associated with a Mobile Station International ISDN Number (MSISDN) 714 and a GMSC address 716 associated with the originating GSM MSC 514. In the second instance, the SRI message 544 is associated with Forwarding Reason 718 and the GMSC address 716.

In the first instance, the ITB 114 recognizes that the SRI message 524 should be translated to a LOCREQ message 526 because the SRI message 524 does not include forwarding data. The ITB uses the MSISDN parameter 714 to generate dialed digits 718 associated with the output TIA-41 LOCREQ message 526. The ITB 114 generates a BILLID parameter 720 and associates it with a Call Reference Number 721 and stores the parameters 720, 721 in association in the temporary storage device (not shown) or call record. The ITB 114 uses the GMSC address 716 to generate a key into the configuration database 138 to retrieve information used to generate an MSCID 722.

In the second instance, the ITB 114 recognizes that the SRI message 524 should be translated to a TRANUMREQ message 546 because the SRI message 524 does include forwarding data (Forwarding Reason 718). The ITB 114 reformats the Forward Reason parameter 718 to generate a TIA-41 Redirection Reason parameter 724 to be transmitted along with the TIA-41 TRANUMREQ message 546. The ITB 114 uses the MSISDN parameter 714 to generate a key into the subscriber database 140 to collect information useful in generating or accessing and Electronic Serial Number (ESN) 726 and a Mobile Station Identifier (MSID) 728. Additionally, the ITB 114 uses the GMSC address 716 to generate a key into the configuration database 138 to collect information for generating an MSC ID parameter 730 or for accessing the MSC ID 730 parameter stored during an earlier translation. The other messages (and parameters) are translated in a similar fashion.

For example, the TIA-41 locreq return result 534 is associated with an Electronic Serial Number (ESN) 726, a Mobile Station Identifier (MSID) 728, an MSC ID 730, Destination Digits 732, and Carrier Digits 734. In generating the SRI Ack 536, the ITB uses the MSID 728 to generate an International Mobile Subscriber Identity (IMSI) parameter 736. The ITB 114 uses the Destination Digits 732 to generate a Mobile Station Roaming Number (MSRN) 738. The Carrier Digits 734 are used to generate an NAEA preferred carrier ID 740. A transaction identifier (not shown) is a key into the configuration database 138 or the temporary storage device or call record (not shown) to generate a GMSC address 742.

Additionally, the ITB 114 may store parameter information in the subscriber and/or configuration databases for use in subsequent translations. For instance, the ESN 726 and MSID 728 parameters may be stored in association with call 522 identifying information so they may be accessed, for example, in translating the second SRI message 544 to the TRANUMREQ message 546. Other parameters may also be stored.

The REDREQ message 540 carries the MSID parameter 728, the ESN 726, and the BILLID 720. Additionally, the REDREQ message includes a Redirection Reason (REDREASON) 742. The MSID 728 is used to generate or look up the IMSI 736 to accompany the output Resume Call Handling message 542. The ITB 114 uses the BILLID parameter 720 to access the temporary storage device or call record (not shown) to retrieve the Call Reference Number 721 stored there during the processing of the SRI 524. The Redirection Reason 742 is reformatted into a GSM-based Forwarding Reason 744. Additionally, the ITB generates a forward-to-number parameter. Ultimately, a genuine forward-to-number will be provided by the TIA-41 HLR 518 within the tranumreq return result 548. However, in GSM systems, a forwarding number is provided to the originating MSC (e.g., 514) by the serving MSC in the RCH message 542. Therefore, the originating GSM MSC 514 expects a forwarding number in the RCH message 542 and the ITB provides one. Actual forwarding numbers can be maintained in the subscriber database 140. Alternatively, the ITB 114 may provide a default forwarding number that will be replaced with the real forwarding number provided by the TIA-41 HLR 518.

Logic internal to the TIA-41 to GSM translator is sufficient to generate a notification to calling party parameter 748 for the RCH message 542. The notification to calling party parameter signals that an indication should be delivered to a calling party that the call 522 is being forwarded.

The TIA-41 tranumreq return result 548 from the TIA-41 HLR 518 includes Destination Digits 750 and Carrier Digits 752 associated with the redirection or forwarding number. The ITB 114 uses the Destination Digits 750 to generate a forwarding number 754. The Carrier Digits are used to generate an NAEA preferred carrier ID 756. The parameters 754, 756 are transmitted to the GSM MSC 514 along with the output SRI Ack message 550.

The Resume Call Handling acknowledgement message 552 is unassociated with parameters of interest. The ITB simply translate the RCH Ack message 552 into a TIA-41 redreq return result 554 which is also unassociated with parameters of interest.

The invention has been described with reference to particular embodiments. Modifications and alterations will occur to others upon reading and understanding this specification. For example, the ITB can include additional message handlers and more or fewer translators. A single translator might translate messages in two directions or be adapted to translate between three or more protocols. The ITB may be implemented in hardware or software or as a combination of both. An ITB may be embodied as a stand-alone network element, be co-located with another network element or be implemented as part of another network element, such as, for example, an originating MSC, an HLR, or an IIF. It is intended that all such modifications and alterations are included insofar as they come within the scope of the appended claims or equivalents thereof.

What is claimed is:

1. A method operative to assist in a termination of a call when an originating mobile switching center (MSC) based on a first standard requests the location of a subscriber that is associated with a home location register (HLR) that is based on a second standard, the method comprising:
    receiving a location request in a first standard format from the originating MSC;
    generating a location request in a second standard format based on the received location request;
    transmitting the generated location request to the HLR;
    receiving a location request acknowledgement in the second standard format from the HLR;
    generating a location request acknowledgement in the first standard format based on the received location request acknowledgement;
    transmitting the generated location request acknowledgement to the originating MSC;
    receiving a call redirection request in the second standard format from a serving MSC;
    generating a call redirection request in the first standard format based on the received call redirection request;
    transmitting the generated call redirection request to the originating MSC;
    receiving a call redirection information request in the first standard format from the originating MSC;
    generating a call redirection information request in the second standard format based on the received call redirection information request;
    transmitting the generated call redirection information request to the HLR;
    receiving a call redirection information request acknowledgement in the second standard format from the HLR;
    generating a call redirection information request acknowledgement in the first standard format based on the call redirection information request acknowledgement in the second standard format received from the HLR; and,
    transmitting the generated call redirection information request acknowledgement to the originating MSC.

2. The method of claim 1 further comprising:
    receiving a call redirection request acknowledgement in the first standard format from the originating MSC;
    generating a call redirection request acknowledgement in the second standard format based on the received call redirection request acknowledgement; and,
    transmitting the generated call redirection request acknowledgement to the serving MSC.

3. The method of claim 1 wherein receiving the location request in the first standard format from the originating MSC comprises:
    receiving a LOCREQ message in a Telecommunication Industry Association-41 (TIA-41) format from a TIA-41-based originating MSC.

4. The method of claim 1 wherein generating a location request in a second standard format comprises:
    generating an SRI message in a Global System for Mobile Communications (GSM) format.

5. The method of claim 1 wherein receiving the call redirection request in the second standard format from the serving MSC comprises:
    receiving a Resume Call Handling message in a Global System for Mobile Communications (GSM) format from a GSM-based serving MSC.

6. The method of claim 1 wherein generating a call redirection request in the first standard format comprises:
    generating a REDREQ message in a Telecommunication Industry Association-41 (TIA-41) format.

7. The method of claim 1 wherein receiving a call redirection information request in the first standard format comprises:
    receiving a TRANUMREQ message in a Telecommunication Industry Association-41 (TIA-41) format.

8. The method of claim 1 wherein generating a call redirection information request in the second standard format comprises:
    generating an SRI message in a Global System for Mobile Communications (GSM) format.

9. The method of claim 2 wherein receiving a call redirection request acknowledgement in the first standard format comprises:
    receiving a redreq return result message in a Telecommunication Industry Association-41 (TIA-41) format.

10. The method of claim 2 wherein generating a call redirection request acknowledgement in the second standard format comprises:
    generating a Resume Call Handling Ack message in a Global System for Mobile Communications (GSM) format.

11. The method of claim 1 wherein receiving the location request in the first standard format from the originating MSC comprises:
    receiving an SRI message in a Global System for Mobile Communications (GSM) format from a GSM-based originating MSC.

12. The method of claim 1 wherein generating a location request in a second standard format comprises:
    generating a LOCREQ message in a Telecommunication Industry Association-41 (TIA-41) format.

13. The method of claim 1 wherein receiving the call redirection request in the second standard format from the serving MSC comprises:
    receiving a REDREQ message in a Telecommunication Industry Association-41 (TIA-41) format from a TIA-41-based serving MSC.

14. The method of claim 1 wherein generating a call redirection request in the first standard format comprises:
generating a Resume Call Handling message in a Global System for Mobile Communications (GSM) format.

15. The method of claim 1 wherein receiving a call redirection information request in the first standard format comprises:
receiving an SRI message in an Global System for Mobile Communications (GSM) format.

16. The method of claim 1 wherein generating a call redirection information request in the second standard format comprises:
generating a TRANUMREQ message in a Telecommunication Industry Association-41 (TIA-41) format.

17. The method of claim 2 wherein receiving a call redirection request acknowledgement in the first standard format comprises:
receiving a Resume Call Handling Ack message in a Global System for Mobile Communications (GSM) format.

18. The method of claim 2 wherein generating a call redirection request acknowledgement in the second standard format comprises:
generating a redreq return result message in a Telecommunication Industry Association-41 (TIA-41) format.

19. A method operative to assist in a termination of a call when a Telecommunication Industry Association-41-based (TIA-41-based) originating MSC requests a location of a subscriber that is associated with a Global System for Mobile Communications-based (GSM-based) HLR, the method comprising:
receiving a LOCREQ message from the Telecommunication Industry Association-41 (TIA-41) -based originating mobile switching center (MSC);
generating an SRI message based on the LOCREQ message;
transmitting the SRI message to the Global System for Mobile Communications (GSM)-based HLR;
receiving an SRI Ack message from the GSM-based HLR including an MSRN;
generating a locreq return result message including a temporary local directory number (TLDN) based on the SRI Ack message and the mobile station roaming number (MSRN);
transmitting the locreq return result message including the TLDN to the TIA-41-based MSC;
receiving a Resume Call Handling message from a GSM-based serving MSC;
generating REDREQ message based on the Resume Call Handling message;
transmitting the REDREQ message to the TIA-41-based originating MSC;
receiving a TRANUMREQ message from the TIA-41-based originating MSC;
generating an SRI message based on the TRANUMREQ message;
transmitting the SRI message to the GSM-based HLR;
receiving an SRI Ack message from the GSM-based HLR;
generating a tranumreq return result message based on the SRI Ack message; and
transmitting the tranumreq return result message to the TIA-41 based originating MSC.

20. The method of claim 19 further comprising:
receiving a redreq return result message from the TIA-41-based originating MSC;
generating a Resume Call Handling Ack message based on the redreq return result message; and,
transmitting the Resume Call Handling Ack message to the GSM-based serving MSC.

21. A method operative to assist in a termination of a call when a Global System for Mobile Communications-based (GSM-based) originating MSC requests a location of a subscriber that is associated with a Telecommunication Industry Association-41-based (TIA-41-based) HLR, the method comprising:
receiving an SRI message from the GSM-based originating MSC;
generating a LOCREQ message based on the SRI message;
transmitting the LOCREQ message to the TIA-41-based HLR;
receiving a locreq return result message from the TIA-41-based HLR including an TLDN;
generating an SRI Ack message including an MSRN based on the locreq return result message and the TLDN;
transmitting the SRI Ack message including the MSRN to the GSM-based originating MSC;
receiving a REDREQ message from a TIA-41-based serving MSC;
generating Resume Call Handling message based on the REDREQ message;
transmitting the Resume Call Handling message to the GSM-based originating MSC;
receiving an SRI message from the GSM-based originating MSC;
generating a TRANUMREQ message based on the SRI message;
transmitting the TRANUMREQ message to the TIA-41-based HLR;
receiving a tranumreq return result message from the TIA-41-based HLR;
generating an SRI Ack message based on the tranumreq return result message; and,
transmitting the SRI Ack message to the GSM-based originating MSC.

22. The method of claim 21 further comprising:
receiving a Resume Call Handling Ack message from the GSM-based originating MSC;
generating a redreq return result message based on the Resume Call Handling Ack message; and,
transmitting the redreq return result message to the TIA-41-based serving MSC.

23. An apparatus operative to assist in a termination of a call when an originating mobile switching center (MSC) based on a first standard requests the location of a subscriber that is associated with a home location register (HLR) that is based on a second standard, the method comprising:
means for receiving a location request in a first standard format from the originating MSC;
means for generating a location request in a second standard format based on the received location request;
means for transmitting the generated location request to the HLR;
means for receiving a location request acknowledgement in the second standard format from the HLR;
means for generating a location request acknowledgement in the first standard format based on the received location request acknowledgement; and,
means for transmitting the generated location request acknowledgement to the originating MSC;
means for receiving a call redirection request in the second standard format from a serving MSC;
means for generating a call redirection request in the first standard format based on the received call redirection request;

means for transmitting the generated call redirection request to the originating MSC;

means for receiving a call redirection information request in the first standard format from the originating MSC;

means for generating a call redirection information request in the second standard format based on the received call redirection information request;

means for transmitting the generated call redirection information request to the HLR;

means for receiving a call redirection information request acknowledgement in the second standard format from the HLR;

means for generating a call redirection information request acknowledgement in the first standard format based on the call redirection information request acknowledgement in the second standard format received from the HLR; and, means for transmitting the generated call redirection information request acknowledgement to the originating MSC.

24. The apparatus of claim 23 further comprising:

means for receiving a call redirection request acknowledgement in the first standard format from the originating MSC;

means for generating a call redirection request acknowledgement in the second standard format based on the received call redirection request acknowledgement; and, means for transmitting the generated call redirection request acknowledgement to the serving MSC.

* * * * *